April 5, 1966  G. L. HAMMOND  3,243,960
ELECTRIC VALVE ACTUATOR
Filed June 3, 1964  2 Sheets-Sheet 1
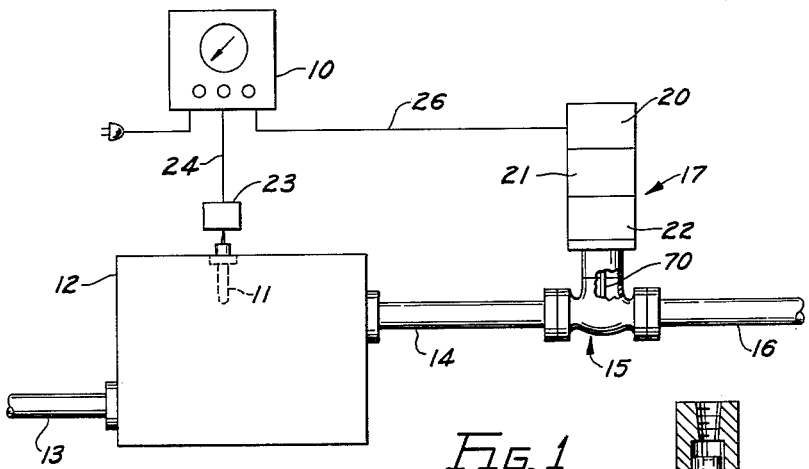
Fig. 1
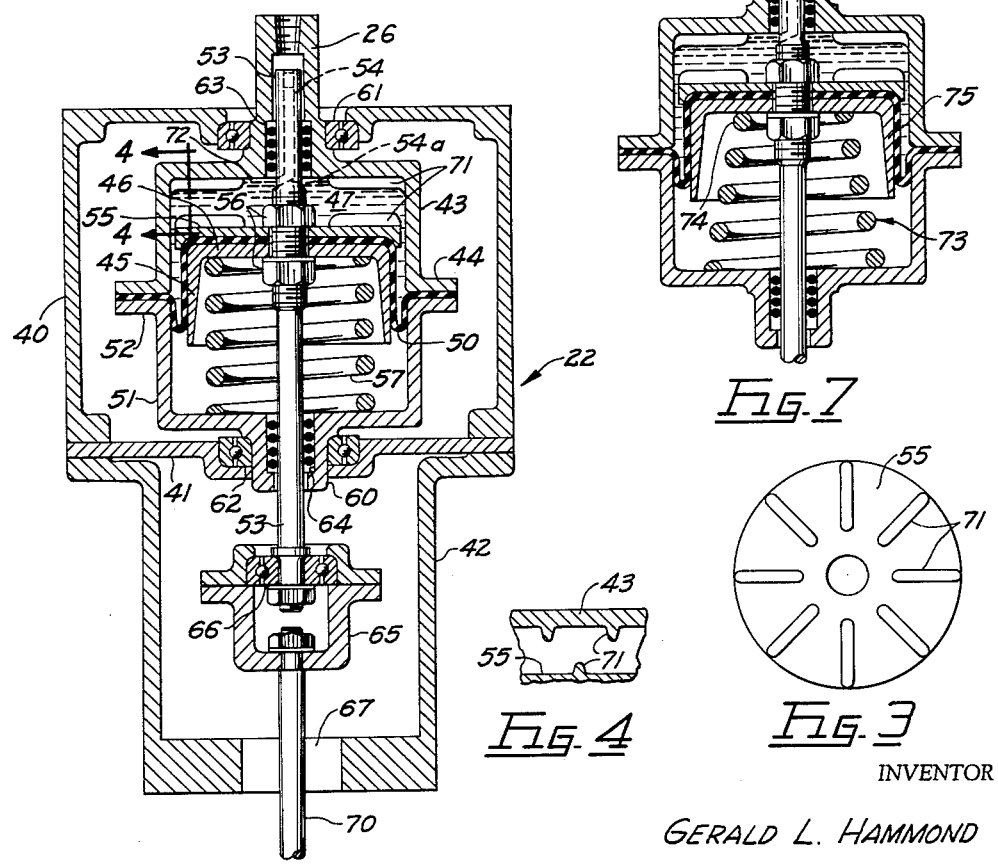
Fig. 2
Fig. 4
Fig. 7
Fig. 3
INVENTOR
GERALD L. HAMMOND
BY
J. E. Turcotte
ATTORNEY April 5, 1966   G. L. HAMMOND   3,243,960
ELECTRIC VALVE ACTUATOR Filed June 3, 1964   2 Sheets-Sheet 2

INVENTOR

GERALD L. HAMMOND

BY

J. E. Turcotte

ATTORNEY

United States Patent Office 3,243,960
Patented Apr. 5, 1966

3,243,960
ELECTRIC VALVE ACTUATOR
Gerald L. Hammond, 1633 S. Ashland Ave.,
Park Ridge, Ill.
Filed June 3, 1964, Ser. No. 372,287
5 Claims. (Cl. 60—54.5)

The present invention relates to an electrically operated industrial process control system and more particularly to an electric actuator for the final control element of the system for controlling or maintaining constant a process condition such as temperature, flow rate, pressure, liquid level, and the like.

An electrically operated process control system typically comprises a final control element, such as a valve or the like, responsive to a control signal and arranged to effect variations in a process characteristic such as temperature, liquid flow rate, pressure, liquid level, etc. In conventional systems the final control element, such as the valve, is most frequently actuated by air. This, of course, requires an air supply system which is expensive to install and maintain. It is well known that conventional pneumatic systems are subject to malfunction due to fouling from dirt, scale and oil, and freeze-ups in cold weather caused by air which is not dry. In addition, pneumatic systems are relatively slow in response. It is therefore an important object of this invention to provide an electric valve actuator which is not subject to the deficiencies of conventional pneumatic systems and which eliminates the need for an air supply ssytem.

Another object of the invention is to provide a valve actuator in which the power supply may be a conventional public utility power line.

A further object is to provide a valve actuator which has a relatively fast response time and adequate thrust capability.

Still another object is to provide a valve actuator which is low in cost, easy to maintain, small in size, direct or reverse acting, and unlimited as to orientation.

Briefly stated, in accord with the illustrated embodiment of the present invention there is shown an industrial process control system of the type having a process controller which receives a condition measurement signal and produces a corresponding control signal for transmission to a remotely-located process control valve via an electronic control circuit which receives the controller output signal, and in which electrically operated drive means responsive to the control signal are provided consisting of an electric motor drive unit the speed of which varies in proportion to the magnitude of the control signal. The process control valve is actuated by a motion transducer comprising a cylinder coupled to the electric motor drive unit for rotation with it. Disposed in the cylinder is a piston which is movable along the axis of rotation of the cylinder. A fluid chamber is defined between adjacent end wall portions of the cooperating cylinder and piston. A rolling diaphragm sealing member bridging from the piston to the cylinder provides a fluid tight seal for the fluid chamber adapting it to hold a fixed supply of hydraulic fluid. The cylinder and piston walls forming the fluid chamber may advantageously be provided with a series of radial fins to ensure efficient coupling between the hydraulic fluid and the rotating walls of the chamber. A helical spring presses against the underside of the piston, urging it to move in a direction to reduce the volume of the chamber. A shaft member, attached to the piston for movement therewith, is coupled to a valve stem for operating the process control valve through the medium of a free running coupling element. On rotation of the fluid chamber by the drive unit, the centrifugal forces generated by the rotation of the chamber cause the fluid in the chamber to exert corresponding forces on the piston in opposition to the spring pressure. These forces overcome the spring and cause the piston to move a proportionate distance in the axial direction. The piston carries the shaft, coupling, and valve stem with it, causing the process control valve to move to the desired valve position. The free-running coupling device divorces the rotary motion of the shaft of the fluid chamber from the valve stem, resulting in linear motion only of the valve stem.

The invention, both as to its organization and method of operation, together with further objects and advantages will best be understood by reference to the following description taken in connection with the accompanying drawings, in which:

FIG. 2 is a diagrammatic view of an industrial process control system embodying the valve actuator of the present invention with a portion of the actuator wall broken away to show internal details;

FIG. 2 is an enlarged sectional view showing details of the motion transducer portion of the electric valve actuator of the present invention;

FIG. 3 is a plan view showing certain details of a plate member employed in the motion transducer of FIG. 2;

FIG. 4 is a fragmentary sectional elevation view taken along the lines 4—4 of FIG. 2 to illustrate details of the motion transducer of FIG. 2;

FIG. 7 is a fragmentary sectional elevation view of a motion transducer showing an alternate spring construction.

Figure 5:
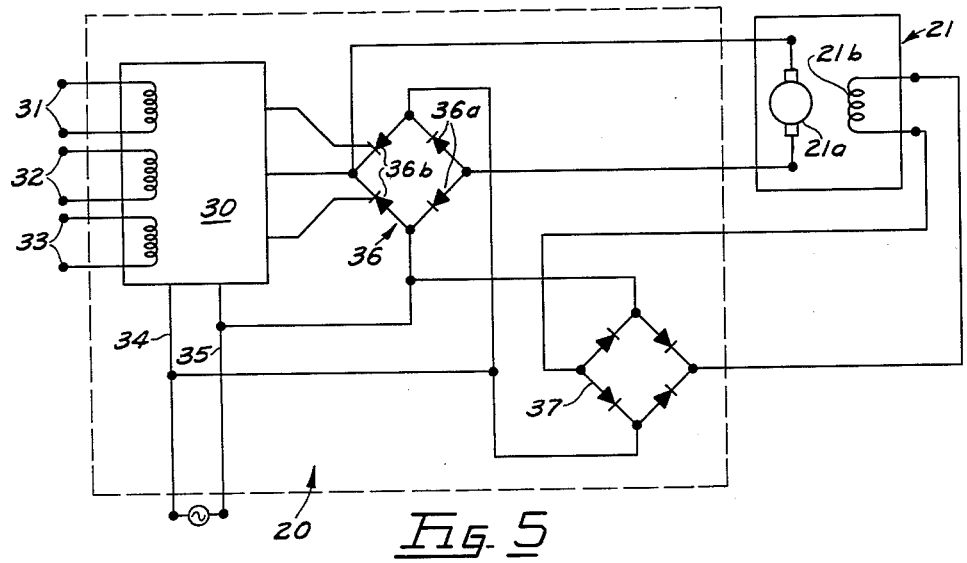
FIG. 5 is a schematic diagram of the electronic control circuit portion of the present invention employing a D.C. form of drive unit.

Referring now to the drawings, in FIG. 1 there is shown an exemplary industrial process system including a conventional process controller 10. This controller is arranged to receive a measurement signal from a condition-responsive device such as a thermometer 11 disposed so as to measure the temperature of the water in a water heater 12. Details of heater 12 have been omitted as they form no part of the invention. Water to be heated is supplied to heater 12 via a conduit 13. The heated water output of heater 12 is transferred from heater 12 via conduits 14 and 16. Interposed between conduits 14 and 16 is a control valve 15 actuated by an electric valve actuator 17. Actuator 17 includes a control signal amplifier unit 20, an electric motor drive unit 21, and a motion transducer unit 22. The controller 10 may be powered from a suitable A.C. source, and is arranged to receive a measurement signal from thermometer 11 via a conventional temperature transmitter 23 and a line 24, and to transmit a control signal to amplifier unit 20 via conductors in a cable 26. Controller 10 is provided with conventional control knobs and may advantageously include a meter with a scale and an indicating needle. The control knobs may be set following conventional practice so that the position of the movable valve portion (not shown) of control valve 15 is continuously adjusted in response to the condition sensed by condition responsive device 11. Thus, if thermometer 11 senses a water temperature above the pre-set level determined by the control knob setting, control valve 15 will be actuated toward a desired more open position. However, if a temperature condition below the pre-set level is sensed by thermometer 11, valve 15 will be actuated to move toward the desired more closed position where it will remain until the pre-set water temperature level is again attained in heater 12 at which time the valve will be actuated toward a more open position. In this fashion control valve 15 will be constantly adjusted to provide extremely accurate valve control.

In a preferred form of the invention the motion transducer 22 is of the form shown in section in FIG. 2. The electric motor drive unit 21 (FIGS. 1 and 5) is coupled to transducer 22 via a conventional motor coupling (not shown) suitably secured to a hollow shaft 26 projecting from an end portion of the motion transducer 22 as indicated in FIG. 2.

Motor drive unit 21 (FIGS. 1 and 5) provides a variable speed drive to transducer 22 which varies in proportion to a variable D.C. input supplied to the armature of motor 21 from control signal amplifier unit 20 (FIGS. 1 and 5). The control signal transmitted to signal amplifier unit 20 from controller 10 is in the form of a D.C. current in the range 1–50 milliamps. Control signal amplifier unit 20 includes a conventional magnetic amplifier firing unit 30, FIG. 5, connected to a suitable A.C. source by lines 34 and 35, which may advantageously be provided with input terminals comprising a pair of 1–5 ma. terminals 31, a pair of 4–20 ma. terminals 32, and a pair of 10–50 ma. terminals 33. Magnetic amplifier unit 30 is connected to a rectifier bridge 36 comprising a pair of rectifiers 36a, and a pair of silicon controlled rectifiers 36b. Bridge 36 is connected, in turn, to the armature 21a of motor 21, providing a D.C. input to armature 21a varying in response to the changes in the control signal transmitted from controller 10. The fixed D.C. input to the field 21b of motor 21 is provided by a rectifier bridge 37, supplied from A.C. lines 34 and 35.

Figure 6:
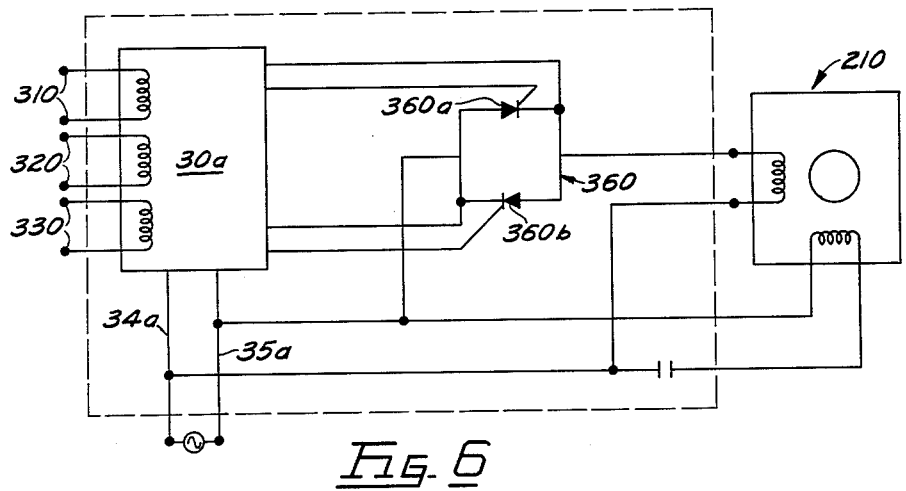
FIG. 6 is a schematic diagram of an alternate form of electronic control circuit employing an A.C. form of drive unit.

The present invention may also be employed in conjunction with an A.C. motor drive unit as shown in FIG. 6. In FIG. 6 an A.C. motor 210 is provided with a variable A.C. input varying with changes in the control signal via a magnetic amplifier firing unit 30a and a bridge arrangement 360, employing a pair of silicon controlled rectifiers 360a and 360b, connected as shown, and a fixed A.C. input via A.C. supply lines 34a and 35a connected to supply A.C. power to firing unit 30a. Firing unit 30a is also provided with input terminals comprising 1–5 ma. terminals 310, 4–20 ma. terminals 320, and 10–50 ma. terminals 330.

Returning now to FIG. 2, the motion transducer 22 includes an upper housing 40 from which hollow shaft 26 projects, and a lower housing 42, separated from upper housing 40 by a bearing plate 41. Within upper housing 40 is a downwardly open hollow cylinder 43, having a projecting mounting flange 44. A piston 45 disposed within cylinder 43 has an end wall 46 disposed across the open end of cylinder 43. A closed chamber 47 is thus formed between the end and side walls of cylinder 43 and the end wall 46 of piston 45. A sealing means comprising a conventional rolling diaphragm 50, of neoprene or the like, is disposed between cylinder 43 and piston 45 so that chamber 47 is adapted to hold a hydraulic fluid. The proportions of diaphragm 50 are adapted to accommodate the maximum stroke length required to operate control valve 15. Another hollow cylinder 51, of approximately the same diameter as cylinder 43, is disposed within upper housing 40. Cylinder 51 has an open end with a projecting mounting flange 52 for cooperation with flange 44. Cylinders 43 and 51 are bolted together at the mounting flanges 44 and 52, with the periphery of diaphragm 50 extending between the flanges. Piston 45 is mounted on a shaft 53 which extends centrally through piston wall member 46 and an approximately circular plate member 55 (FIGS. 2 and 3) disposed in chamber 47 against diaphragm 50. A pair of nuts 56 are drawn up tight against wall member 46 and plate 55 so that diaphragm 50 disposed between them will seal against shaft 53. Resilient means comprising a helical coil spring 57 is interposed between piston 45 and cylinder 51 to urge piston 45 and shaft 53 on which it is mounted to move inward with respect to cylinder 43.

The end walls of cylinders 43 and 51 have central projections comprising, respectively, the hollow shaft 26, and a projection 60 on cylinder 51, for mounting the assembly comprising the cylinders 43 and 51 in bearings 61 and 62 for rotation with respect to housings 40 and 42. Hollow shaft 26 and projection 60 are provided with suitable journal boxes 63 and 64 for supporting the assembly comprising shaft 53 and piston 45, and for permitting low friction axial motion of the assembly comprising shaft 53 and piston 45.

Shaft 53 includes a central passage 54 and an intersecting radial passage 54a opening into fluid chamber 47 for supplying hydraulic fluid to chamber 47. After chamber 47 receives its charge of hydraulic fluid, passage 54 is suitably plugged to seal chamber 47.

The lower end of shaft 53 is supported in a free running coupling 65 disposed in lower housing 42 and including a bearing assembly 66. Secured to coupling 65 is the output shaft 70 of motion transducer 22. The housing 42 is provided with a central passage 67 through which projects the output shaft 70 which may be connected as the valve stem to operate the valve of control valve 15. It will be recognized that, if desired, coupling 65 connecting shafts 53 to shaft or stem 70 could be disposed within cylinder 51 rather than housing 42, as shown.

The hydraulic fluid employed in fluid chamber 47 may be selected on the basis of the characteristics desired. Specific gravity, temperature stability, and cost are factors to be considered. Mercury has an advantage because of its high specific gravity, and may be used as the fluid in chamber 47, although its cost is relatively high. Carbon tetrachloride is another fluid that may be used. At present it is preferred to use glycerine as the hydraulic fluid as its specific gravity, availability, temperature stability, and cost characteristics are all relatively favorable.

Means comprising a plurality of radial fins 71 projecting from the walls of chamber 47 are provided to ensure positive coupling between the walls of the chamber and the hydraulic fluid 72 disposed therein to increase operating speed and decrease response time and hysteresis. The fins 71 may be disposed on the walls of cylinder 43 enclosing chamber 47, or on plate 55, or both. The preferred arrangement is illustrated in FIGS. 2–4 with fins on both the cylinder walls and plate 55, in a staggered relationship as shown in FIG. 4.

FIG. 7 illustrates an alternate helical coil spring arrangement in which the spring 73 is conical in shape, with the smallest diameter end turn 74 adjacent the piston 75. In this arrangement the spring turns vary in diameter and the turns increase in diameter in a direction outward from the piston 75. This arrangement is advantageous in that varying loads cause different diameter turns to flex. At low speeds the larger diameter turns do most of the flexing and at higher speeds the smaller diameter turns come into play. The spring 73 may thus be calibrated to provide a linear motion for the transducer 22 for a given speed of rotation. Other configurations of the helical spring may be used, depending on the motor speed versus fluid chamber shaft position relationship desired.

In operation of the system of FIG. 1, drive motor 21 drives fluid chamber 47 and fluid therein in rotation with it via the motor coupling to shaft 26. The rotational speed varies with the magnitude of the control signal as described above. When the hydraulic fluid is rotated, a centrifugal force is developed which in turn creates a hydrostatic pressure which is confined within the fluid filled chamber 47 enclosed by the cylinder, piston, and seal. This hydrostatic pressure is directly proportional to the speed of rotation squared, the inside radius of the cylinder to the fourth power, and the specific gravity of the hydraulic fluid. The thrust developed by the electric valve actuator 17 thus is proportional to a constant, multiplied by the specific gravity of the hydraulic fluid used, multiplied by the radius of the fluid chamber to the fourth power, multiplied by the rotational speed of the fluid chamber to the second power. The mathematical formula may thus be expressed as follows:

$$F=(K)(S.G.)(R)^4(S)^2$$

in which:

F=thrust developed in pounds
K=constant
S.G.=specific gravity of fluid used
R=radius of fluid chamber in inches
S=speed of fluid chamber in revolutions per minute.

The hydrostatic pressure developed in chamber 47 forces the piston 45 to move away from the end of the cylinder 43 as the opposing force of the helical spring is overcome. This movement of the piston along the axis of rotation of chamber 47 carries with it output shaft or valve stem 70 causing the desired operation of control valve 15.

The electric valve actuator described herein is substantially unlimited as to orientation as the fluid chamber 47 is completely sealed. Another advantage of the sealed chamber is a fixed volume of hydraulic fluid in the chamber with no requirements of addition of makeup fluid from time to time. The motion transducer assembly of FIG. 2 may also be rotated about its axis without limitation. The actuator is also adapted for direct or reverse action of the output shaft depending on the side of the piston the helical spring bears against. Of course, the fluid chamber must be disposed on the side of the piston opposite to that against which the spring bears. If reverse action is employed, the projection 60 must be provided with an appropriate fluid seal.

It will be recognized by those skilled in this art that the present invention provides an improved valve actuator which is low in cost, easy to maintain, of high thrust capability, fast acting, small size, and with no theoretical limitation on size and thrust.

While there has been described what is at present considered to be the preferred embodiment of the invention, it will be understood that various other modifications may be made therein and are intended to be included within the scope of the appended claims wherein there is claimed.

What is claimed is:

1. A valve actuator comprising: means forming a rotatable hydraulic fluid chamber, said means forming a chamber including a cylinder and a piston disposed therein, said piston being movable with respect to said cylinder along the axis of rotation of said chamber; resilient means urging said piston to move in a first direction with respect to said cylinder; sealing means for sealing between said cylinder and said piston to adapt said chamber to hold a fixed supply of hydraulic fluid; means for rotating said means forming a chamber at varying speeds, the centrifugal forces generated by the rotation of said chamber causing fluid in said chamber to force said piston to move in a direction with respect to said cylinder other than said first direction against the urging of said resilient means, said means for rotating said means forming a chamber including means disposed at a location remote from said valve for sensing a process condition and for developing a signal representative of said process condition, drive means for rotating said fluid chamber at speeds varying in proportion to the magnitude of said signal, and means for transmitting said signal to said drive means; and a shaft member attached to said piston for axial movement therewith to control a valve in response to changes in the speed of rotation of said chamber.

2. A valve actuator as claimed in claim 1, in which the sealing means comprises a rolling diaphragm bridging between adjacent wall portions of said cylinder and said piston, said rolling diaphragm accommodating the maximum stroke length required to operate a valve associated with said actuator.

3. An actuator for controlling a valve comprising: means forming a rotatable hydraulic fluid chamber, said means forming a chamber including a cylinder and a piston disposed therein, said piston being movable with respect to said cylinder along the axis of rotation of said chamber; resilient means urging said piston into said cylinder; sealing means for sealing between said cylinder and said piston to adapt said chamber to hold a fixed supply of hydraulic fluid; means for rotating said means forming a chamber at varying speeds, the centrifugal forces generated by the rotation of said chamber causing fluid in said chamber to force said piston outward from said cylinder against the urging of said resilient means, said means for rotating said means forming a chamber including a controller mounted at a location remote from said valve for sensing a process condition and for developing a control signal representative of said process condition, drive means for rotating said fluid chamber at speeds varying in proportion to the magnitude of said control signal, and circuit means for amplifying and transmitting said control signal from said controller to said drive means; and a shaft member attached to said piston for axial movement therewith to control a valve in response to changes in the speed of rotation of said chamber.

4. An actuator for controlling a valve as claimed in claim 3, in which the circuit means is adapted to amplify and transmit direct current control signals in the range 1–50 ma.

5. An actuator for controlling a valve comprising: means forming a rotatable hydraulic fluid chamber, said means forming a chamber including a cylinder and a piston disposed therein, said piston being movable with respect to said cylinder along the axis of rotation of said chamber; resilient means comprising a conical helical spring urging said piston into said cylinder; sealing means for sealing between said cylinder and said piston to adapt said chamber to hold a fixed supply of hydraulic fluid; means for rotating said chamber at varying speeds, the centrifugal forces generated by the rotation of said chamber causing fluid in said chamber to force said piston outward from said cylinder against the urging of said resilient means; and a shaft member attached to said piston for axial movement therewith to control a valve in response to changes in the speed of rotation of said chamber.

References Cited by the Examiner

UNITED STATES PATENTS

| 1,222,984 | 4/1917 | Pharo | 73—523 |
|---|---|---|---|
| 1,237,335 | 8/1917 | Hennebohle | 137—53 |
| 2,896,412 | 7/1959 | Becker et al. | 60—54.5 |
| 2,954,674 | 10/1960 | Kane | 60—54.5 |
| 3,098,358 | 7/1963 | Paschke | 60—52 |

FOREIGN PATENTS 763  2/1877  Great Britain.

SAMUEL LEVINE, *Primary Examiner.*

ROBERT R. BUNEVICH, *Examiner.*